(12) United States Patent
Usui et al.

(10) Patent No.: US 6,411,664 B1
(45) Date of Patent: Jun. 25, 2002

(54) CORRELATION DETECTING APPARATUS, ITS DETECTING METHOD AND COMMUNICATION APPARATUS AND ITS COMMUNICATION METHOD

(75) Inventors: Takashi Usui, Tokyo; Hisaki Hiraiwa; Takehiro Sugita, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/139,434

(22) Filed: Aug. 25, 1998

(30) Foreign Application Priority Data

Aug. 27, 1997 (JP) .............................................. 9-231175

(51) Int. Cl.[7] .............................. H03D 1/00; H04L 27/06
(52) U.S. Cl. ......................................... 375/343; 375/259
(58) Field of Search ................................. 375/130, 142, 375/143, 150, 152, 259, 285, 342, 343, 348, 354, 359, 340; 370/503, 507, 509

(56) References Cited

U.S. PATENT DOCUMENTS 5,426,670 A * 6/1995 Leppanen et al.
5,687,190 A * 11/1997 Tsao

* cited by examiner

Primary Examiner—Jean Corrielus
(74) Attorney, Agent, or Firm—Jay H. Maioli

(57) ABSTRACT

A correlation detecting apparatus is capable of securely detecting a M sequence code forming a reference for timing even when a plurality of signals with different amplitudes are time division multiplexed includes matched filter (82) for detecting a predetermined code from a received signal, an average amplitude detector circuit (83) for detecting an average amplitude of the received signal, and a divider circuit (84) for normalizing an output of the matched filter (82) by an output of the average amplitude detector circuit 83 are provided. The output of the matched filter (82) normalized by the divider circuit (84) is compared with a threshold value for outputting a correlation detecting signal. When a received signal level is large, the output level of the matched filter (82) becomes large. However, in this case because the average amplitude of the received signal also becomes large, a divided value of the output level of the matched filter (82) by the output level of the average amplitude detector circuit (83) makes almost no change. In contrast to this, the output level of the matched filter when an M sequence is received remains nearly constant irrespective of an input signal level. Therefore, the received signal of M sequence can be detected without fail from the output of the comparator circuit (85).

18 Claims, 10 Drawing Sheets

CORRELATION DETECTING APPARATUS, ITS DETECTING METHOD AND COMMUNICATION APPARATUS AND ITS COMMUNICATION METHOD

BACKGROUND OF THE INVENTION

1. Field of the Invention

The present invention relates to a correlation detecting apparatus and a method for detecting a specific code contained in a received signal, and particularly relates to a code detecting apparatus and a method which are preferably applied to a case where a timing connects a plurality of terminals in a wireless fashion.

2. Description of the Prior Art

As the function of a computer becomes higher, it is now popularized to construct a LAN (Local Area Network) by connecting a plurality of computers in order to share files or data, or transfer electronic mails or data. The conventional LAN employs an optical fiber or a coaxial cable, otherwise a twist pair cable to connect each computer by a wire.

However, in such a wired LAN, connecting works are required, thus making it difficult to readily construct the LAN and besides, in the wired LAN the cables become complicated. Therefore, a wireless LAN is now attracting attention as a system which releases a user from wiring of the conventional wired LAN.

As the wireless LAN, such a version that data communication is performed on a CDMA (Code Division Multiple Access) system using a spread spectrum has heretofore been proposed. In the CDMA system, transmitting data is multiplied by a PN (Psuedo Noise Code) code, thereby causing the spectrum of transmitting data to be spread. Transmitted data with such a spread spectrum is demodulated by multiplying the similar PN code similar to the transmitting side. This CDMA system is characterized by high privacy property and excellent interfere-resistance.

Recently, information is increasingly turned into multimedia, so that a large amount of data such as video data and audio data is now often handled. For this reason, it has also been demanded for the wireless LAN to make a speed of transfer rate higher so that a large amount of data such as video data and audio data can be transmitted. Unfortunately, in the spectrum spread modulation, if data transfer is performed at a high rate, e.g. about 30 Mbps, a band width of 300 MHz or more will then be required. Such a wide band width cannot be ensured with the present frequency allocation and so it is difficult to secure such a wide band width for making communication.

Moreover, with the spectrum spread method, in order to demodulate, a synchronism capturing time is required for matching the phase of transmitted data code with the phase of a code generated to demodulate in a receiver. For this reason, in the spectrum spread method, a synchronizing bit sequence is inserted in each packet in order to capture the synchronism at a high speed. Due to such a synchronizing bit sequence, a problem in which bits other than effective data increase will arise.

Therefore, the applicant of this application has proposed that data is transmitted on an OFDM (Orthogonal Frequency Division Multiplexing) system, data communication being performed on a TDMA (Time Division Multiple Access) system making one frame as a unit, an M sequence being transmitted at the head of one frame, a transmitting/receiving time being determined with reference to this M sequence and the transmitting/receiving time of each wireless communication terminal being indicated by control information from a wireless communication control terminal. According to the OFDM system, the transfer rate can be raised and the correct demodulation can be achieved even if any jitter arises. Furthermore, because the transmitting/receiving timing is set up with reference to the M sequence at the head of one frame, data can be reproduced during reception by demodulating only a required symbol within a frame using that time information.

Where the M sequence is received and the timing is set in this manner, it is necessary to detect the M sequence from a received signal. For a circuit to detect such the M sequence, it is conceived to employ a correlation detector circuit using a matched filter.

FIG. 1 shows an example of the correlation detector circuit using the matched filter as described above. Referring to FIG. 1, a received signal from an input terminal 151 is supplied to a matched filter 152. The matched filter 152 is a sort of an FIR filter and, as is shown in FIG. 2, is comprised of delay circuits 161-1, 161-2, 161-3, . . . , multiplier circuits 162-1, 162-2, 162-3, . . . and an adder circuit 163. Coefficients of the multiplier circuits 162-1, 162-2, 162-3, . . . are set to 1 or (−1) depending on a code to be detected. If a strong correlation exists between codes which are set as the coefficients of the multiplier circuits 162-1, 162-2, 162-3, . . . and the received code, an output level of the adder circuit 163 will rise.

Thus, the matched filter 152 detects the correlation between the received code and the code set for the filter. The output of the matched filter 152 is supplied to a comparator circuit 153. The comparator circuit 153 compares the output of the matched filter 152 with a predetermined threshold value TH.

If the code of M sequence is received, the output of matched filter 152 rises and the output of the matched filter 152 exceeds the threshold value TH. If the output of matched filter 152 exceeds the threshold value TH, a detecting output occurs at an output terminal 154.

In such a system, however, signals from a plurality of wireless communication terminals are time division multiplexed within the frame for transmission and so different levels of signals are received from the respective wireless communication terminals and a wireless communication control terminal. Therefore, even if the matched filter 152 receives the M sequence and yields the received output of the M sequence, this signal output may be hidden by other signal components. This will raise a problem that the M sequence signal cannot be detected.

Specifically, the received signal is subjected to an AGC (Automatic Gain Control) and controlled so that the received signal level may be constant. Thus, when any signal with an excessive amplitude is input immediately before the M sequence signal, then the AGC will act to reduce its gain. If the M sequence signal is received in a condition that the gain is reduced, the detected level of correlation signal of M sequence will be lowered and buried in a strong received signal, thus making it impossible to be detected. Moreover, even though only a portion near an area where the M sequence is received may be extracted, the detected level of correlation signal of M sequence will turn below the threshold value, thereby making it impossible to detect the M sequence signal.

In this way, where the plurality of signals with different signal levels are transmitted on the time division fashion, it is difficult to ensure the detection of M sequence signal with such a construction as compares the output of matched filter with a predetermined threshold value.

SUMMARY OF THE INVENTION

Therefore, an object of the present invention is to provide a correlation detecting apparatus which is capable of ensuring the detection of a code sequence even if a plurality of signals with different amplitudes are time division multiplexed.

The present invention provides a correlation detecting apparatus comprising a matched filter means for detecting a predetermined code from a received signal, an average amplitude detecting means for detecting an average amplitude of the received signal, a normalizer means for normalizing an output of the matched filter means by an output of the average amplitude detecting means and a comparator means for comparing the normalized output of the matched filter means by the normalizer means with a threshold value to output a correlation detecting signal and its method.

Further, the present invention provides a communication apparatus comprising an input means inputted with a received signal, a synchronizing signal detecting means for detecting a synchronizing signal contained in the received signal from the received signal, and a demodulating means for demodulating and outputting the received signal based on the synchronizing signal, in which the synchronizing signal detecting means is provided with a detecting means for detecting a predetermined signal from the received signal, an average amplitude detecting means for detecting an average amplitude of the received signal, a normalizing means for normalizing an output of the detecting means based on an output of the average amplitude detecting means, and a comparing means for comparing an output of the detecting means normalized by the normalizing means with a threshold value to thereby output a correlation detecting signal, and its communication method.

Also, the present invention provides a communication apparatus comprising an input means inputted with a received signal, a synchronizing signal detecting means for detecting a synchronizing signal contained in the received signal from the received signal, and a transmitting means for transmitting data based on a detecting timing of the synchronizing signal, in which the synchronizing signal detecting means is provided with a detecting means for detecting a predetermined signal from the received signal, an average amplitude detecting means for detecting an average amplitude of the received signal, a normalizing means for normalizing an output of the detecting means based on an output of the average amplitude detecting means, and a comparing means for comparing an output of the detecting means normalized by the normalizing means with a threshold value to thereby output a correlation detecting signal, and its communication method.

The correlation detecting apparatus compares the divided and normalized value of the output of matched filter by the average amplitude of the received signal with the threshold value in order to detect the code of M sequence from the received signal. Because the output of matched filter is directly proportional to an input signal level, the output increases not only when the M sequence is received but also when the received signal level is large. When the received signal level is large, the output level of matched filter increases. On this occasion, the average amplitude of received signal also increases. For this reason, the divided value of the output level of matched filter by the output level of average amplitude detector circuit makes almost no change. In contrast, the output level of matched filter when the M sequence is received remains nearly constant irrespective of the input signal level. Therefore, by comparing the divided and normalized value of the output of matched filter by the average amplitude of the received signal with the threshold value to detect the M sequence code from the received signal, it is enabled to securely detect the M sequence signal from the received signal.

Since the M sequence (synchronizing signal) can be detected from the received signal surely, data can be transmitted at an accurate timing with a described portion of the received signal.

DESCRIPTION OF THE PREFERRED EMBODIMENTS

Figure 1:
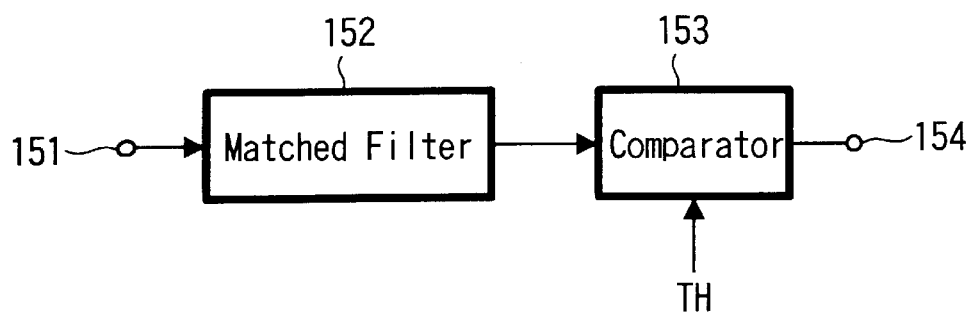
FIG. 1 is a block diagram showing an example of a prior art correlation detecting circuit.
Figure 2:
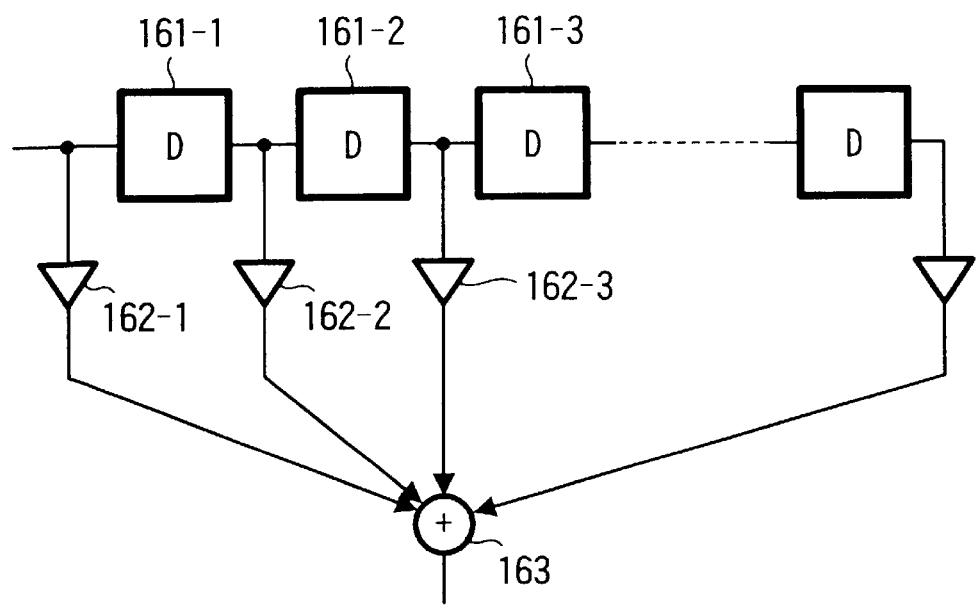
FIG. 2 is a block diagram showing an example of a matched filter.
Figure 3:
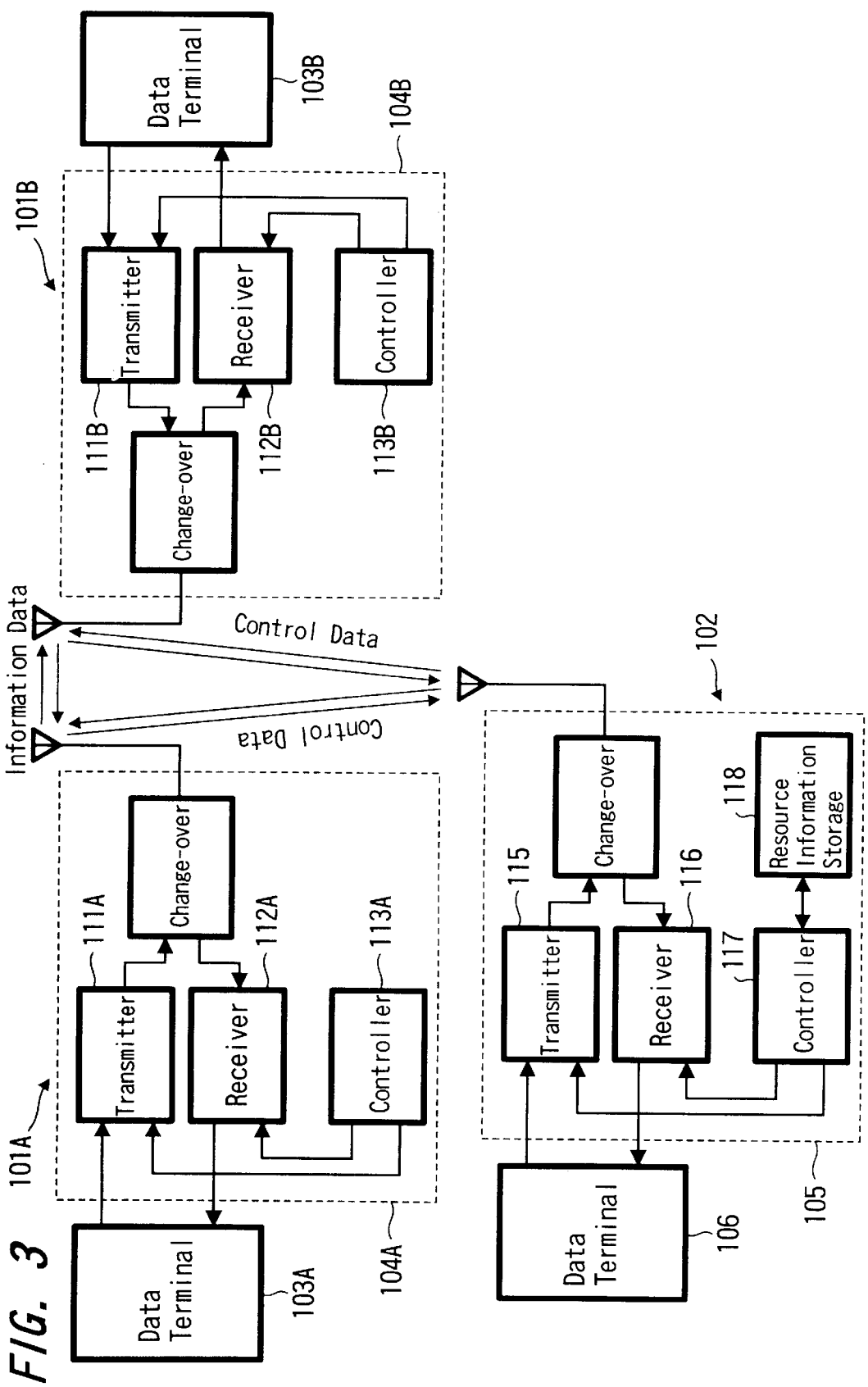
FIG. 3 is a block diagram showing an arrangement of a wireless LAN system to which the present invention is applicable.

An embodiment of the present invention will now be described below with reference to the accompanying drawings. FIG. 3 shows schematically a wireless LAN system to which the present invention is applied. The wireless LAN system to which the present invention is applied comprises a plurality of wireless communication terminals 101A, 101B . . . and a wireless communication control terminal 102. The wireless communication terminals 101A, 101B, . .

include data terminals 103A, 103B, . . . such as a computer and so on connected with wireless communication units 104A, 104B, . . . respectively. The wireless communication control terminal 102 includes a data terminal 106 connected with a wireless communication unit 105. Data communication takes place among the plurality of wireless communication terminals 101A, 101B, . . . and the data communication among the respective wireless communication terminals 101A, 101B . . . is controlled by the wireless communication control terminal 102. Further, the wireless communication control terminal 102 may be constructed only by the wireless communication unit 105.

The respective wireless communication units 104A, 104 B, . . . of wireless communication terminals 101A, 101B, . . . are formed by transmitters 111A, 111B, . . . , receivers 112A, 112B, . . . and controllers 113A, 113B, . . . , respectively. The transmitters 111A, 111B, . . . and the receivers 112A, 112B, . . . are arranged so that the data communication can be performed in a wireless fashion by an OFDM system.

The wireless communication unit 105 of wireless communication control terminal 102 is formed by a transmitter 115, a receiver 116 and a controller 117. The transmitter 115 and the receiver 116 are also arranged so that the data communication can be performed by wireless on the OFDM system. In addition, the wireless communication unit 105 of wireless communication control terminal 102 side includes a resource information storage 118 for storing resource information concerning time allocation of the data communication among the wireless communication terminals.

In this system, the data communication takes place based on the OFDM system. For example, 147455 symbols (corresponding to 4 msec) of the OFDM system are defined as one frame and within this frame time division multiplexed data are transmitted.

At the head of one frame, the M sequence code for capturing synchronism is transmitted from the wireless communication unit 105 of wireless communication control terminal 102. The M sequence code for capturing the synchronism is received by the respective wireless communication units 104A, 104B, . . . of wireless communication terminals 101A, 101B, . . . and with reference to this reception timing the transmitting/receiving timing of data is established.

When the wireless communication terminals 101A, 101B, . . . request the data communication, the transmission request is transmitted from the wireless communication units 104A, 104B, . . . of wireless communication terminals 101A, 101B, . . . to the wireless communication unit 105 of wireless communication control terminal 102. The wireless communication unit 105 of wireless communication control terminal 102 determines an allocated transmitting time of each of wireless communication terminals 101A, 101B, . . . based on the transmission request and the resource information. Control information including the allocated transmitting time is transmitted from the wireless communication unit 105 of wireless communication control terminal 102 to the respective wireless communication units 104A, 104B, . . . of the wireless communication terminals 101A, 101B, . . . . Data transmission/reception is performed in the respective wireless communication units 104A, 104B, . . . of wireless communication terminals 101A, 101B, . . . according to the allocated transmitting time. on this occasion, the transmitting/receiving timing of data is determined with reference to the M sequence for capturing the synchronism which is transmitted at the head of one frame.

Figure 4:
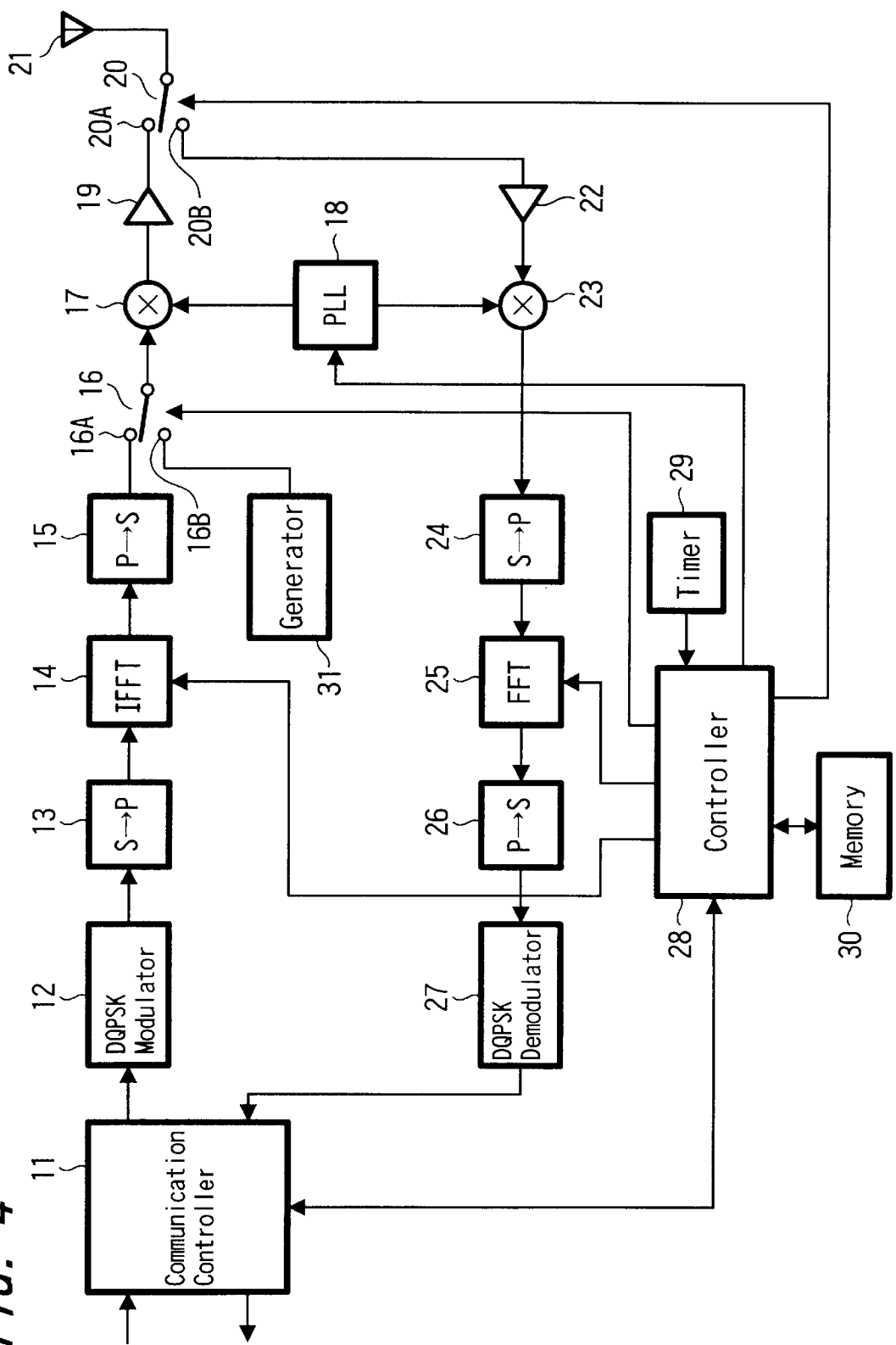
FIG. 4 is a block diagram showing an example of a wireless communication unit on a wireless communication control terminal side in the wireless LAN system to which the present invention is applicable.

FIG. 4 shows an arrangement of the wireless communication unit 105 of wireless communication control terminal 102. Referring to FIG. 4, 11 denotes a communication controller and through this communication controller 11 data exchange for the data terminals takes place.

Transmitting data from the communication controller 11 is supplied to a DQPSK (Differentially Encoded Quadrature Phase Shift Keying) modulator circuit 12. The DQPSK modulator circuit 12 DQPSK-modulates the transmitting data.

An output of the DQPSK modulator circuit 12 is supplied to a serial/parallel converter circuit 13. This serial/parallel converter circuit 13 converts serial data into parallel data. An output of the serial/parallel converter circuit 13 is supplied to an IFFT (Inverse Fast Fourier Transform) circuit 14. This IFFT circuit 14 maps the transmitting data to the frequency domain data and inversely Fourier transforms the same into the temporal domain data. An output of the IFFT circuit 14 is supplied to a parallel/serial converter circuit 15.

The serial/parallel converter circuit 13, the IFFT circuit 14 and the parallel/serial converter circuit 15 convert the data into a multicarrier signal according to the OFDM system. The OFDM system uses a plurality of subcarriers whose frequency interval is of, each subcarrier being made orthogonal one another to eliminate an inter-code interference, and allocates a low bit rate signal to each subcarrier so that a high bit rate can be achieved as a whole.

Figure 5:
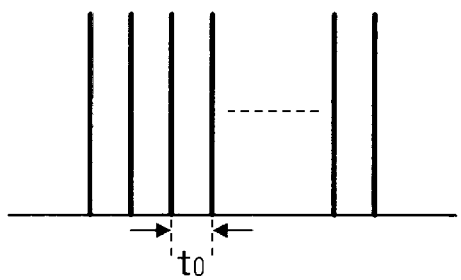
FIG. 5 is a spectrum diagram used to explain an OFDM system.

FIG. 5 shows a spectrum of transmitting wave form according to the OFDM system. As shown in FIG. 5, in the OFDM system, signals are transmitted using the subcarriers which are one another orthogonal and have a frequency interval fo.

In the OFDM system, signals are generated by mapping the transmitting signal to the frequency domain and transforming it from the frequency domain to the temporal domain using the inverse FFT. Decoding is inversely performed by acquiring the wave form received at every of interval and transforming the temporal domain signal into the frequency domain signal using the FFT.

Figure 6:
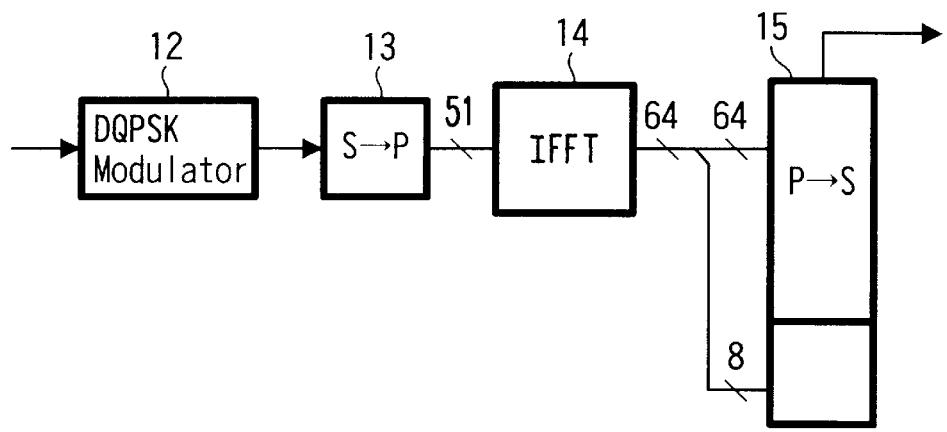
FIG. 6 is a block diagram used to explain the OFDM system in the wireless LAN system to which the present invention is applicable.

In this example, as shown in FIG. 6, the serial/parallel converter circuit 13 converts fifty-one samples of the output from the DQPSK modulator circuit 12 into parallel data which are mapped to the frequency domain. The output of serial/parallel converter circuit 13 is transformed into the temporal domain data by the IFFT circuit 14. The IFFT circuit 14 outputs effective symbol of sixty-four samples. To effective samples of the sixty-four samples, eight samples of guard interval are added.

Figure 7:
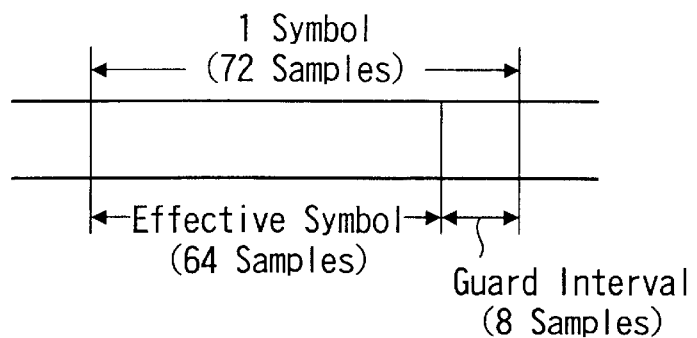
FIG. 7 is a schematic diagram used to explain the OFDM system in the wireless LAN system to which the present invention is applicable.

Therefore, in this example, as shown in FIG. 7, one symbol includes the effective symbol of sixty-four samples and the guard interval of eight samples, namely seventy-two samples in total. A symbol period T symbol is for example (T symbol=1.953 μsec) and a sample period T sample is for example (T sample=27.127 sec). A sample frequency f sample is for example (f sample=36.864 MHz).

Because the OFDM system transmits data distributed into the plurality of subcarriers, a long time is required to transmit one symbol. Further, because the guard interval is added on the time axis, the system is characterized in that it is hard to be affected by the jitter and the multipath. By the way, the guard interval is selected between ten and twenty percents or so of the effective symbol length.

In other words, with the OFDM system, it is necessary to extract the effective symbol length from the continuously receiving signal during demodulation for performing the FFT. Even though any error may be introduced due to the jitter or the like when the effective symbol length is extracted, due to the presence of guard interval, frequency components will not alter and only a phase difference will be produced. This will enable the demodulation by inserting a known pattern into the signal for phase correction or by canceling the phase difference using the differential coding. In case of the normal QPSK modulation only, it is necessary to match the timing at every bit, but in the OFDM system even if several bits deviate, only several dB deterioration in sensitivity will be caused, which allows the demodulation.

Referring back to FIG. 4, an output of the parallel/serial converter circuit 15 is supplied to a terminal 16A of a switching circuit 16. To another terminal 16B of the switching circuit 16 is supplied an output of an M sequence (Maximum Length Code) generator circuit 31.

The output of switching circuit 16 is supplied to a frequency converter circuit 17. To the frequency converter circuit 17 a local oscillating signal is supplied from a PLL synthesizer 18. The frequency converter circuit 17 converts the transmitting signal into a predetermined frequency. For the transmitting frequency, it may be considered to employ, e.g. 2.4 GHz, 5.7 GHz and 19 GHz band of the quasi-microwave band or the like.

The output of frequency converter circuit 17 is supplied to a power amplifier 19. The power amplifier 19 amplifies the transmitting signal. The output of power amplifier 19 is supplied to a terminal 20A of a switching circuit 20. The switching circuit 20 is switched depending on the transmitting time or receiving time. During transmission of data it is switched to the terminal 20A for supplying the output of the switching circuit 20 to an antenna 21.

A received signal from the antenna 21 is supplied to the switching circuit 20. During reception of data the switching circuit 20 is switched to another terminal 20B. Thus, the output of switching circuit 20 is supplied to a frequency converter circuit 23 after it is amplified through a LNA (Low Noise Amplifier) 22.

A local oscillating signal is supplied from the PLL synthesizer 18 to the frequency converter circuit 23. This frequency converter circuit 23 converts the received signal into an intermediate frequency signal.

The output of frequency converter circuit 23 is supplied to a serial/parallel converter circuit 24, and an output of the serial/parallel converter circuit 24 is supplied to an FFT circuit 25. The output of FFT circuit 25 is supplied to a parallel/serial converter circuit 26.

The serial/parallel converter circuit 24, the FFT circuit 25 and the parallel/serial converter circuit 26 perform the decoding of OFDM system. In other words, the serial/parallel converter circuit 24 extracts the effective data and acquires the received wave form at every of interval for converting into parallel data. The output of serial/parallel converter circuit 24 is supplied to the FFT circuit 25, and the FFT circuit 25 transforms the signal of temporal domain into the signal of frequency domain. In this way, by fast Fourier transforming the wave form sampled at every interval of fo, the decoding of OFDM system takes place.

An output of the parallel/serial converter circuit 26 is supplied to a DQPSK demodulator circuit 27, and this DQPSK demodulator circuit 27 processes for the DQPSK demodulation. The output of DQPSK demodulator circuit 27 is supplied to the communication controller 11, and this communication controller 11 outputs the received data.

An overall operation is controlled by a controller 28. The transmission and reception of data are controlled by the communication controller 11 based on instruction from the controller 28.

This system is arranged so that data is transmitted making one frame as a unit on the TDMA system and the M sequence code for capturing the synchronism is transmitted in one symbol at the head of one frame. In order to implement such control, the wireless communication unit 105 of wireless communication control terminal 102 is provided with the M sequence generator circuit 31, the resource information memory 30 and a timer 29. The switching circuit 16 is switched to the terminal 16B side at the timing of symbol at the head of one frame. This causes one symbol of the M sequence to be transmitted at the timing of the head of frame.

When a transmission request is transmitted from any of the wireless communication unit 104A, 104B, . . . of respective wireless communication terminals 101A, 101B, . . . , this transmission request is received by the antenna 21, OFDM demodulated by the FFT circuit 25, DQPSK demodulated by the DQPSK demodulator circuit 27 and then supplied to the communication controller 11. Then, the demodulated received data is supplied from the communication controller 11 to the controller 28.

The controller 28 is provided with the resource information memory 30. This resource information memory 30 stores resource information concerning the transmitting time allocated to the respective wireless communication terminals 101A, 101B, . . . , which is transmitted in one frame. The controller 28 determines the allocated transmitting time for the respective wireless communication terminals 101A, 101B, . . . based on the received transmission request and the communication resource remaining amount. This control information for the allocation of transmission is transmitted from the controller 28 to the communication controller 11. The data from the communication controller 11 is DQPSK modulated by the DQPSK modulator circuit 12, OFDM transformed by the IFFT circuit 14 and transmitted from the antenna 21 toward the wireless communication units 104A, 104B . . . of the respective wireless communication terminals 101A, 101B . . . .

Figure 8:
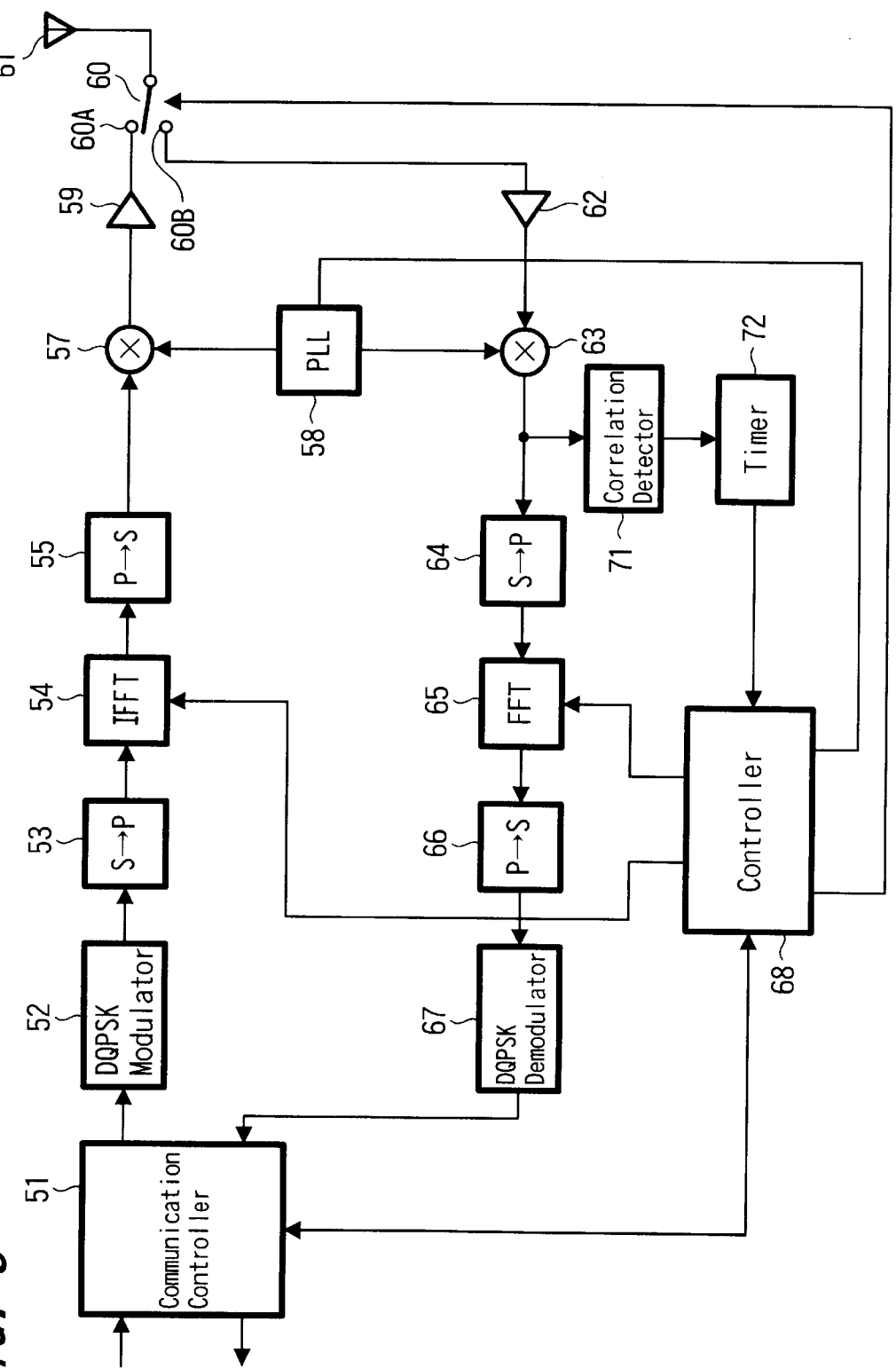
FIG. 8 is a block diagram used to explain an example of a wireless communication unit on a wireless communication control terminal side in the wireless LAN system to which the present invention is applicable.

FIG. 8 shows an arrangement of each of the wireless communication units 104A, 104B, . . . of wireless communication terminals 101A, 101B . . . . Referring to FIG. 8, the transmitting data is input through a communication controller 51. The transmitting data from the communication controller 51 is supplied to a DQPSK modulator circuit 52. This DQPSK modulator circuit 52 DQPSK modulates the transmitting data.

An output of the DQPSK modulator circuit 52 is supplied to a serial/parallel converter circuit 53. This serial/parallel converter circuit 53 converts serial data into parallel data. An output of the serial/parallel converter circuit 53 is supplied to an IFFT circuit 54. This IFFT circuit 54 maps the transmitting data to the frequency domain data and then inversely Fourier transforms it into the temporal domain data. The output of IFFT circuit 54 is supplied to a parallel/serial converter circuit 55. These serial/parallel converter circuit 53, IFFT circuit 54 and parallel/serial converter circuit 55 convert the data into the multicarrier signal according to the OFDM system.

The output of parallel/serial converter circuit 55 is supplied to a frequency converter circuit 57. The frequency converting circuit 57 is supplied with a local oscillating signal from a PLL synthesizer 58. The frequency converter circuit 57 converts the transmitting signal into a predetermined frequency.

The output of frequency converter circuit 57 is supplied to a power amplifies circuit 59, and this power amplifier circuit 59 power-amplifier the transmitting signal. The output of power amplifier 59 is supplied to a terminal 60A of a switching circuit 60. During the transmission of data, the switching circuit 60 is switched to the terminal 60A side. The output of switching circuit 60 is supplied to an antenna 61.

A received signal from the antenna 61 is supplied to the switching circuit 60. During the reception of data, the switching circuit 60 is switched to another terminal 60B side. The output of the switching circuit 60 is supplied to a frequency converter circuit 63 after it is amplified by a LAN 62.

The local oscillating signal is supplied from the PLL synthesizer 58 to the frequency converter circuit 63, and the frequency converter circuit 63 converts the received signal into an intermediate frequency signal.

The output of frequency converter circuit 63 is supplied to a serial/parallel converter circuit 64 as well as a correlation detector circuit 71.

The output of serial/parallel converter circuit 64 is supplied to a FFT circuit 65, and an output of the FFT circuit 65 is supplied to a parallel/serial converter circuit 66. These serial/parallel converter circuit 64, FFT circuit 65 and parallel/serial converter circuit 66 perform the demodulation of OFDM system.

The output of parallel/serial converter circuit 66 is supplied to a DQPSK demodulator circuit 67, and this DQPSK modulator circuit 67 processes for the DQPSK demodulation. The output of the DQPSK demodulator circuit 67 is supplied to the communication controller 51, and the communication controller 51 outputs the received data.

An overall operation is controlled by a controller 68. The transmission and reception of data are controlled by the communication controller 51 based on instructions from the controller 68.

This system is arranged so that data is transmitted making one frame a unit on the TDMA system and in one symbol at the head of one frame, the M sequence code for capturing the synchronism is transmitted from the wireless communication unit 105 of wireless communication control terminal 102. In order to implement such control, the respective wireless communication unit 104A, 104B, . . . are provided with the correlation detector circuit 71 and a timer 72. The M sequence transmitted from the wireless communication unit 105 of wireless communication control terminal 102 at the timing of the head of frame is received by the antenna 61 and transmitted to the correlation detector circuit 71. The correlation detector circuit 71 detects the correlation between the received code and a predetermined set code, and outputs a correlation detecting signal if a strong correlation is estimated. The output of correlation detector circuit 71 is supplied to the timer 72. A time for the timer 72 is set on the basis of the correlation detecting signal from the correlation detector circuit 71.

If there is some data to be transmitted, the transmission request is transmitted from the communication controller 51 based on the instruction of the controller 68. This transmission request is DQPSK modulated by the DQPSK modulator circuit 52, OFDM transformed by the IFFT circuit 54 and transmitted from the antenna 61 toward the wireless communication control terminal 102. The transmission request is received by the wireless communication control terminal 102, and from the wireless communication control terminal 102 the control information including the allocated transmitting time is returned.

This control information is received by the antenna 61, OFDM decoded by the FFT circuit 65, DQPSK demodulated by the DQPSK demodulator circuit 67 and supplied to the communication controller 51. Then, the demodulated received data is transmitted from the communication controller 51 to the controller 68.

The control information contains information concerning the transmitting time. These times are determined with reference to the time of timer 72. The timer 72 is set by the output of correlation detector circuit 71, i.e. the timing of M sequence transmitted from the wireless communication control terminal 102.

When estimating through the timer 72 that it is time to start transmitting, the controller 68 instructs the communication controller 51 to output the transmitting data. This transmitting data is DQPSK modulated by the DQPSK modulator circuit 52, OFDM transformed by the IFFT circuit 54 and output from the antenna 61. Also, when estimating through the timer 72 that it is time to receive, the controller 68 instructs the FFT circuit 65 to process for demodulating the received data.

Thus, this system is arranged so that data is transmitted according to the OFDM system using the multicarriers. An OFDM wave is, as described above, resistant to the jitter and can be demodulated even if several samples deviate. However, if more samples deviate to extend over two symbols, it is impossible for them to be demodulated. Therefore, some extent of time setting is necessary. Thus this system is arranged so that e.g. 147455 symbols (4 msec) make one frame, within this frame data being transmitted on the TDMA system, the M sequence being disposed in one symbol at the head of each frame, and the demodulating timing being determined utilizing this M sequence.

If a receiver clock has a deviation of 6.8 ppm relative to the received OFDM wave, during one frame of 4 msec a time difference of 27.2 nsec is accumulated. This corresponds to a sampling rate of 36.864 MHz. Accordingly, preparing the clock with accuracy of about 6.8 ppm will ensure the demodulation.

In addition, a symbol for synchronization, other than the M sequence two kinds of M sequence equal in period may be employed. It is possible to employ a Gold code which is a code sequence obtained by adding two kinds of M sequence having an equal period, a Barker code, a bulk code and the like.

Figure 9:
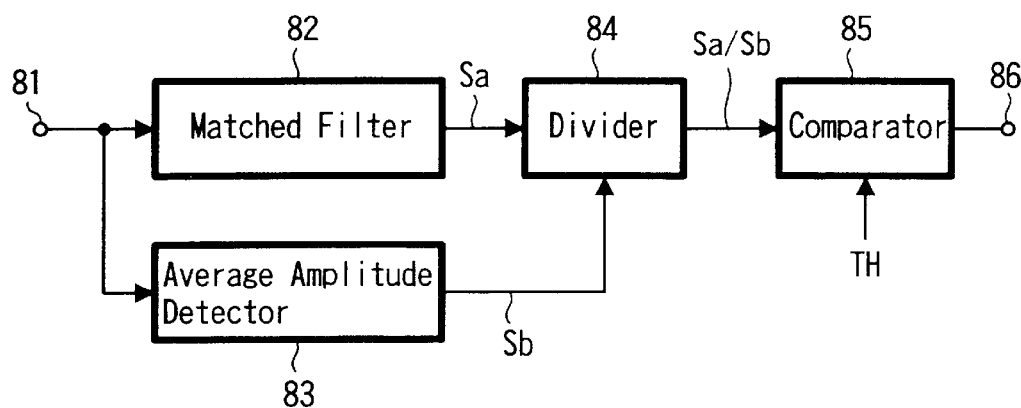
FIG. 9 is a block diagram showing an example of a correlation detecting circuit to which the present invention is applied.

The correlation detector circuit 71 shown in FIG. 8 can be configured as shown in FIG. 9. Referring to FIG. 9, the received signal is supplied to an input terminal 81. The received signal is supplied to a matched filter 82 and also to an average amplitude detector circuit 83. Outputs of the matched filter 82 and average amplitude detector circuit 83 are supplied to a divider circuit 84, and in the divider circuit 84 an output level Sa of matched filter 82 is divided by an output level Sb of average amplitude detector circuit 83. The output of divider circuit 84 is supplied to a comparator circuit 85 to which a predetermined threshold value TH is supplied. The comparator circuit 85 compares the output of divider circuit 84 with the threshold value TH. The output of comparator circuit 85 is output from an output terminal 86 as a correlation value detecting signal.

When the M sequence is being received, the output level Sa of matched filter 82 increases. This makes the output of divider circuit 84 greater than the predetermined threshold value TH, i.e. Sa/Sb>TH is satisfied and the correlation detecting signal appears from the comparator circuit 85. This correlation detecting signal is output from the output terminal 86.

When the input signal has a large amplitude, the output level Sa of matched filter 82 becomes also large. However, when the amplitude of input signal is large, not only the output level Sa of matched filter 82 but also the output level Sb of average amplitude detector circuit 83 go large. This means that the divided value (Sa/Sb) of the output level Sa of matched filter 82 by the output level Sb of average amplitude detector circuit 83 makes almost no change. Then, the output of divider circuit 84 remains smaller than the predetermined threshold value TH, ie. Sa/Sb<TH is satisfied. Thus, no correlation detecting signal appears from the comparator circuit 85.

In this way, when the output of matched filter 82 is normalized by the amplitude level output by the average amplitude detector circuit 83, the detected level will not increase even if the input signal level increases, thereby allowing it to be correctly detected that the M sequence has been received.

Figure 10A:
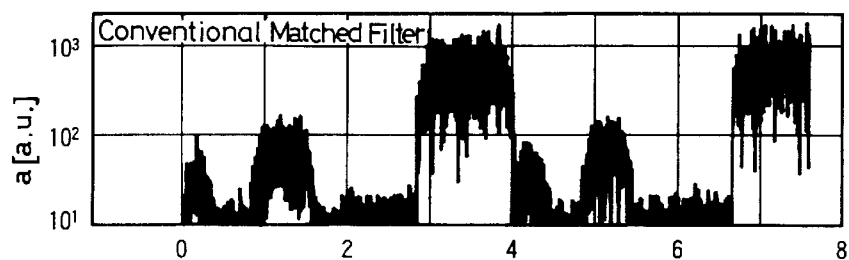
FIGS. 10A, 10B and 10C are respectively waveform diagrams used to explain the example of the correlation detecting circuit to which the present invention is applicable.
Figure 10B:
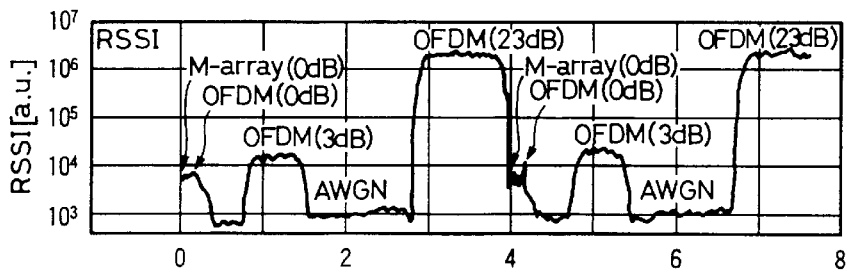
Figure 10C:
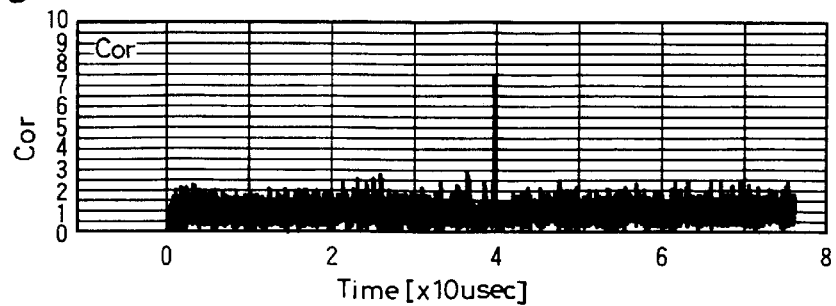

FIG. 10 shows a result of measuring a received signal by such a correlation detector circuit. FIG. 10A shows an output of the matched filter 82, FIG. 10B shows an output of the average amplitude detector circuit 83, and FIG. 10C shows an output of the divider circuit 84.

Because the signals from the plurality of wireless communication terminals 101A, 101B, . . . and the wireless communication control terminal 102 are time division multiplexed within one frame, the intensity of received signal within one frame will vary. Thus, as shown in FIG. 10A, the output of matched filter 82 varies depending on the signal level of received signal.

When an average amplitude of this received signal is detected by the average amplitude detector circuit 83, such a signal as shown in FIG. 10B is obtained. When the output of matched filter 82 shown in FIG. 10A is divided by the output of average amplitude detector circuit 83 shown in FIG. 10B, such a result as shown in FIG. 10C is obtained.

As shown in FIG. 10C, dividing the output of matched filter 82 by the output of average amplitude detector circuit 83 makes the input signal level to be normalized, and so a M sequence receiving signal can be detected without fail.

In the above example, the output of matched filter 82 is divided by the output of average amplitude detector circuit 83. This is expressed by the following formula.

$$\frac{\int_0^{Ts} r(t)P^*(t-\tau)dt}{\sqrt{\int_0^{Ts} |r(t)|^2 dt}} \quad (1)$$

where r(t) is the received signal.

P(t) is the code sequence.

Expressing the above formula (1) in the complex number, where $r(t)=r_{re}(t)+jr_{im}(t)$

*: conjugate $$\sqrt{\frac{\left\{\int_0^T r_{re}(t)P^*(t-\tau)dt\right\}^2 + \left\{\int_0^T r_{im}(t)P^*(t-\tau)dt\right\}^2}{\int_0^T (r_{re} \cdot r_{re} + r_{im} \cdot r_{im})dt}} \quad (2)$$

is obtained.

Unfortunately, in order to implement the above formula, a circuit capable of finding the square root is required so that the number of steps and an amount of hardware are caused to increase. Therefore, it is conceived to make the above formula (1) into the following formula without the square root.

$$\frac{\left\{\int_0^T r_{re}(t)P^*(t-\tau)dt\right\}^2 + \left\{\int_0^T r_{im}(t)P^*(t-\tau)dt\right\}^2}{\int_0^T [\{r_{re}(t)\}^2 + \{r_{im}(t)\}^2]dt} \quad (3)$$

In addition, if this process is to be performed in the digital form of signals, the following formula will be obtained.

$$\frac{\left\{\sum_{i=1}^N r_{re}(i)P^*(i-j)\right\}^2 + \left\{\sum_{i=1}^N r_{im}(i)P^*(i-j)\right\}^2}{\Sigma[\{r_{re}(i)\}^2 + \{r_{im}(i)\}^2]} \quad (4)$$

The above formula (4) requires a process for finding a square, but the process for finding the square causes the number of steps and an amount of hardware to increase and hence is time-consuming. Thus, it is conceivable to process using absolute values according to the following formula instead of the square process. In this way, the number of steps and hardware can be reduced, so that a fast processing can be performed.

$$\frac{|\Sigma r_{re}(i)P^*(i-j)| + |\Sigma r_{im}(i)P^*(i-j)|}{\Sigma\{|r_{re}(i)| + |r_{im}(i)|\}} \quad (5)$$

Figure 11:
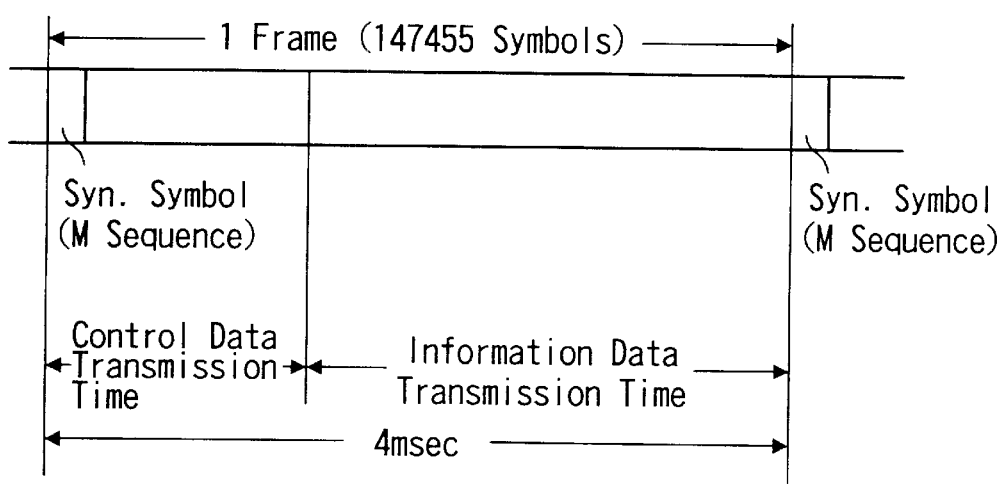
FIG. 11 is a schematic diagram to explain a wireless LAN system to which the present invention is applicable.

FIG. 11 shows the structure of one frame. As shown in FIG. 11, one frame is divided into a control data transmitting time period and an information data transmitting time period. During the control data transmitting time period, data communication takes place in an asynchronous state, while during the information data transmitting time period, data communication takes place in an isochronous state (equal time). Such communications that the symbol for synchronization is transmitted from the wireless communication control terminal 102, the transmission request is transmitted from the respective wireless communication terminal 101A, 101B, . . . to the wireless communication control terminal 102, and the control information containing the allocation of transmission is transmitted from the wireless communication control terminal 102 to the respective wireless communication terminals 101A, 101B, . . . take place in the asynchronous communication during the control data transmitting time period. According to this allocated transmitting time, data transmission among the respective wireless communication terminals 101A, 101B, . . . takes place during the information data transmitting time period in the isochronous manner.

Further, it is also possible to communicate in the asynchronous state during the information data transmitting time period and it is possible to mix the asynchronous communication and the isochronous communication.

Figure 12:
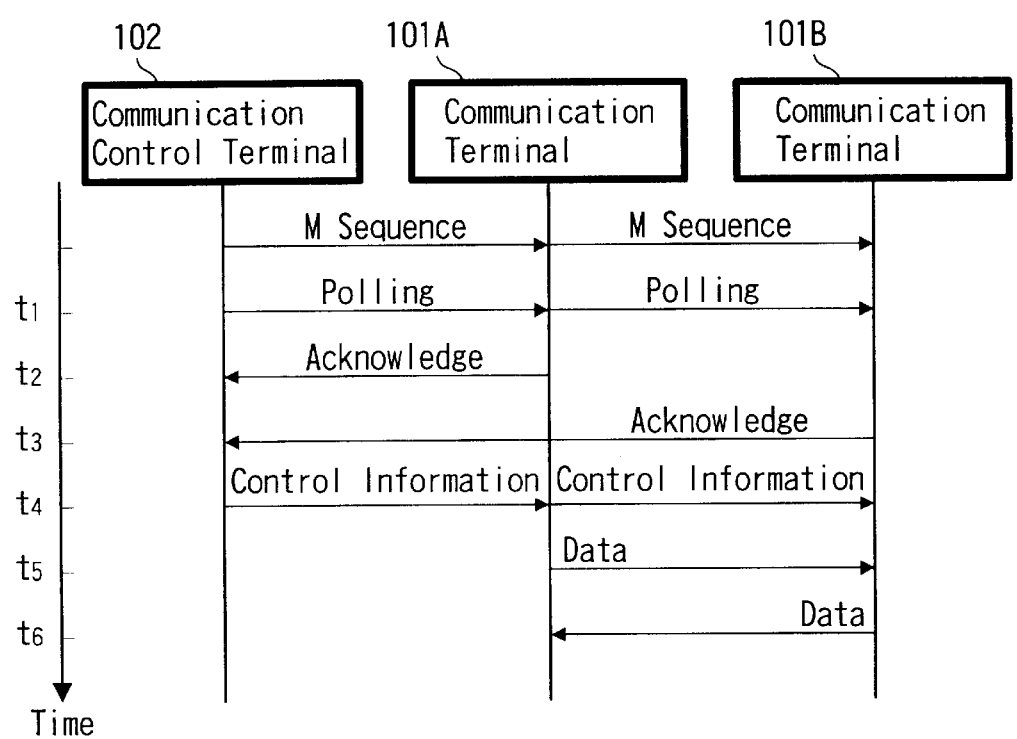
FIG. 12 is a sequence diagram used to explain the wireless LAN system to which the present invention is applicable.
Figure 13:
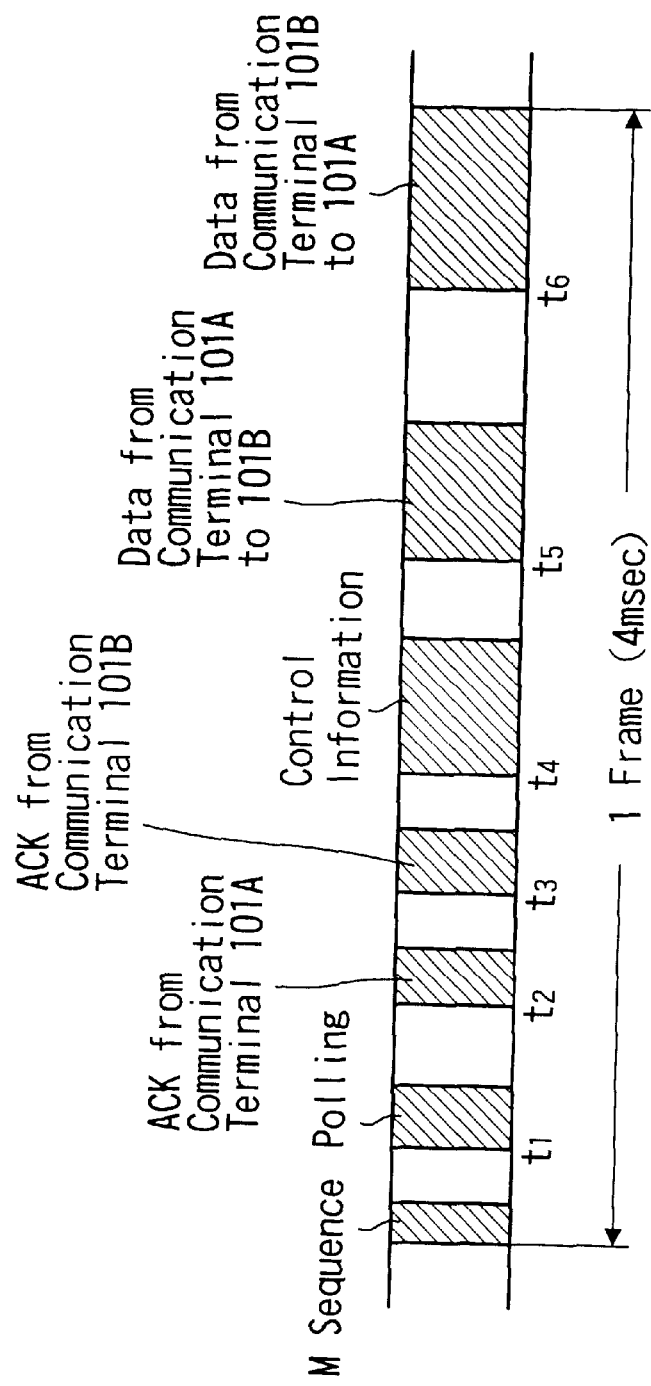
FIG. 13 is a schematic diagram used to explain the wireless LAN system to which the present invention is applicable.

For example, consider a data communication being carried out between the wireless communication terminal 101A and the wireless communication terminal 101B shown in FIG. 3. In this case, such processes as shown in a sequence diagram of FIG. 12 are performed. Within one frame, in such a manner as shown in FIG. 13, data communication takes place on the TDMA system.

As shown in FIG. 12, first of all, in one symbol at the head of one frame, the M sequence is transmitted from the wireless communication unit 105 of wireless communication control terminal 102 to the respective wireless communication units 104A, 104B, . . . of wireless communication terminals 101A, 101B. This M sequence is received by the wireless communication units 104A and 104B of wireless communication terminals 101A and 101B and the timer 72 is set by the M sequence.

Next, at a time point tl, the wireless communication terminals 101A, 101B, . . . are called by the wireless communication unit 105 of wireless communication control terminal 102. When the wireless communication units 104A, 104B, of wireless communication terminals 101A, 101B, . . . are called, they return acknowledgement signals for this calling at time points t2 and t3. At that time, if they request the transmission, the request of transmission is contained in this acknowledgement signal. In this context, let us suppose, for example, that the wireless communication terminal 104A has a data transfer request to transmit data to the wireless communication terminal 104B and the wireless communication terminal 101B has a data transfer request to transmit data to the wireless communication terminal 104A.

The wireless communication unit 105 of wireless communication control terminal 102 determines the allocated transmitting time based on the request of transmission. In this regard, let us suppose that the wireless communication unit 105 of wireless communication control terminal 102 determines that the data transfer from the wireless communication terminal 101A to the wireless communication terminal 101B is started at a time point t5 and the data transfer from the wireless communication terminal 101B to the wireless communication terminal 102A is started at a time point t6.

At a time point t4, the control signal containing this allocated transmitting time is transmitted from the wireless communication unit 105 of wireless communication control terminal 102 to the wireless communication units 104A, 104B of wireless communication terminals 101A, 101B.

When the time point t5 has been reached with reference to the timer 72 set by the received M sequence, the data transfer is started from the wireless communication terminal 101A to the wireless communication terminal 101B. And then, when the time point t6 has been reached with reference to the timer 72, the data transfer from the wireless communication terminal 101B to the wireless communication terminal 101A is started.

The operation within one frame described above is shown on a time basis in FIG. 13. As shown in FIG. 13, data is exchanged within one frame in a time division fashion. Specifically, at the head of one frame the M sequence is transmitted, at the time point tl the respective wireless communication terminals 101A, 101B, . . . are called, at the time points t2 and t3 the acknowledgement signal to this calling is returned, at the time point t4 the control signal containing the allocated transmitting time is transmitted, from the time point t5 the data transfer from the wireless communication terminal 101A to the wireless communication terminal 101B is started, and from the time point t6 the data transfer from the wireless communication terminal 101B to the wireless communication terminal 101A is started.

As described above, because this system employs the OFDM system, it is enabled to implement the fast data rate. Moreover, it is arranged that data communication is performed on the TDMA system making one frame a unit, the M sequence being transmitted at the head of one frame, and the transmitting/receiving time being set with reference to the M sequence.

The transmitting/receiving time for each of the communication terminals 101A, 101B, . . . is directed by the control information from the wireless communication control terminal 102. Because the transmitting/receiving timing is set with reference to the M sequence at the head of one frame, the timer 72 of each of the communication terminals 101A, 101B, . . . is equally set. This enables, during reception, this time information to be utilized and only necessary symbol within one frame to be demodulated for data reproduction. Furthermore, data from the plurality of wireless communication terminals 101A, 101B, . . . are multiplexed within the same frame, so that even if the jitter arises, the demodulation is allowed at the same demodulating timing. Therefore, simultaneously incoming signals from the plurality of wireless communication terminals 101A, 101B, . . . can respectively be received, thus allowing data to be exchanged.

Moreover, even though some deviation may be caused between the timer in the transmitting side and the timer in the receiving side, due to the nature of OFDM system, the demodulation can be made with no error. Accordingly, there is no need to capture the synchronism at every burst before reception and to arrange any bit for synchronism at every burst. Thus, it is possible to make effective use of bits within the frame.

Figure 14:
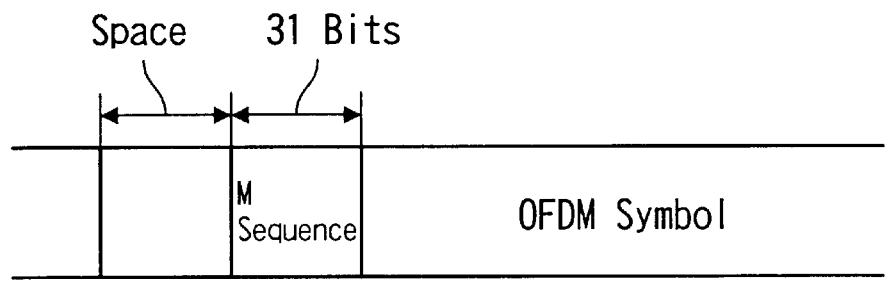
FIG. 14 is a schematic diagram used to explain the wireless LAN system to which the present invention is applicable.

In addition, the above example is arranged so that the M sequence corresponding to one symbol of OFDM system is transmitted at the head of one frame, but this symbol for synchronization is not limited to the one OFDM symbol. A length of the symbol for synchronization is variable. As shown in FIG. 14, the length of M sequence may be made thirty-one bits which is shorter than one symbol and a space may be provided at the head of one frame. Further, the length of M sequence may be longer than one symbol. Moreover, the M sequence for frame synchronization need not be disposed at the head of frame and may be disposed at plural points within the frame.

Figure 15:
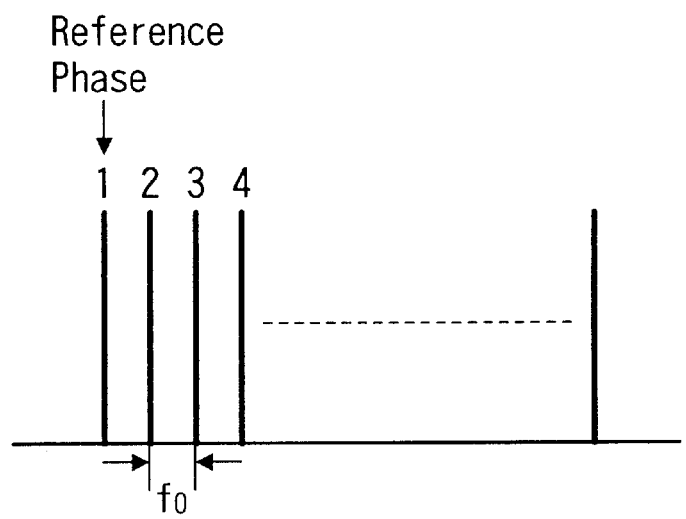
FIG. 15 is a spectrum diagram used to explain the wireless LAN system to which the present invention is applicable.

Furthermore, as shown in FIG. 15, a phase difference between the subcarriers may be made to have some information. In other words, the DQPSK modulation makes differentiation in the direction of frequency. If there is a deviation in the sample timing during reception, the phase of QPSK wave of each subcarrier after the FFT in the OFDM demodulation will rotate. For this reason, in order to acquire the accurate QPSK phase, there is conceived a method in which a signal having a known phase is allocated as a pilot signal to a part of OFDM subcarriers for making it a reference phase. The example shown in FIG. 15 is arranged so that the first carrier has information of the phase difference between subcarriers. In this way, even if the phase rotates, because the amount of rotation between subcarriers is small, few errors will be caused. In addition, while the first carrier is made the carrier to give the reference phase in FIG. 15, other carrier may be made the reference phase.

Moreover, the above example is arranged so that data is DQPSK modulated and transmitted on the multicarrier by the OFDM, but the QAM (Quadrature Amplitude Modulation) which is a multivalued modulation may be employed. For the QAM, there are 16 values, 32 values, 128 values, 256 values and so on. Further, the trellis code modulation which includes encoding may be employed.

Also, while the above example is arranged so that the wireless communication unit 105 of wireless communication control terminal 102 is provided with the M sequence generator circuit 31 and the respective wireless communication units 104A, 104B, . . . of wireless communication terminals 101A, 101B, . . . are provided with the correlation detector circuit 71, it may be configured so that a single wireless communication terminal is provided with both the M sequence generator circuit and the correlation detector circuit, one of which circuits is switched for use depending on whether that terminal is used as the wireless communication control terminal or that terminal is used as the wireless communication terminal.

According to the present invention, the output of matched filter is divided by the average amplitude of received signal to make the normalized value, which value is compared with the threshold value to detect the M sequence code from the received signal. Because the output of matched filter is proportional to the input signal level, when not only the M sequence is received but also the received signal level is large, the output becomes large. When the received signal level is large, the output level of matched filter increases, but the average amplitude of received signal at that time also increases. Consequently, the divided value of the output level of matched filter by the output level of average amplitude detector circuit makes almost no change. In contrast to this, the output level of matched filter when the M sequence is received remains nearly constant irrespective of the input signal level. Therefore, by normalizing the divided value of the output of matched filter by the average amplitude of received signal and comparing the normalized value with the threshold value to detect the M sequence code from the received signal, the detection of the M sequence signal from the received signal is ensured.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A correlation detecting apparatus for detecting a correlation between a predetermined code and a code of a received signal, comprising:

code detecting means for detecting said predetermined code from said received signal;

average amplitude detecting means for detecting an average amplitude of said received signal;

normalizing means for normalizing an output of said code detecting means based on an output of said average amplitude detecting means; and comparing means for comparing said output of said code detecting means normalized by said normalizing means with a threshold value for outputting a correlation detecting signal.

2. The correlation detecting apparatus as set forth in claim 1, wherein said received signal is expressed in a complex number and said average amplitude detecting means determines said average amplitude on the basis of a square of a real part and a square of an imaginary part of said complex number.

3. The correlation detecting apparatus as set forth in claim 1, wherein said received signal is expressed in a complex number and said average amplitude detecting means determines said average amplitude on the basis of an absolute value of a real part and an absolute value of an imaginary part of said complex number.

4. A communication apparatus for receiving a received signal containing a synchronizing signal and for demodulating said received signal, comprising:

input means for inputting said received signal;

synchronizing signal detecting means for detecting said synchronizing signal contained in said received signal; and demodulating means for demodulating and for outputting a desired portion of said received signal based on a detecting timing of said synchronizing signal, wherein said synchronizing signal detecting means includes detecting means for detecting a predetermined signal from said received signal, average amplitude detecting means for detecting an average amplitude of said received signal, normalizing means for normalizing an output of said detecting means based on an output of said average amplitude detecting means, and comparing means for comparing said output of said detecting means normalized by said normalizing means with a threshold value for outputting a correlation detecting signal.

5. The communication apparatus as set forth in claim 4, wherein said received signal is expressed in a complex number and said average amplitude detecting means determines said average amplitude based on a square of a real part and a square of an imaginary part of said complex number.

6. The communication apparatus as set forth in claim 4, wherein said received signal is expressed in a complex number and said average amplitude detecting means determines said average amplitude based on an absolute value of a real part and an absolute value of an imaginary part of said complex number.

7. A communication apparatus for receiving a received signal containing a synchronizing signal and for transmitting data based on a detecting timing of said synchronizing signal, comprising:

input means for inputting said received signal;

synchronizing signal detecting means for detecting said synchronizing signal contained in said received signal; and transmitting means for transmitting said data based on said detecting timing of said synchronizing signal, wherein said synchronizing signal detecting means includes detecting means for detecting a predetermined signal from said received signal, average amplitude detecting means for detecting an average amplitude of said received signal, normalizing means for normalizing an output of said detecting means based on an output of said average amplitude detecting means, and comparing means for comparing said output of said detecting means normalized by said normalizing means with a threshold value for outputting a correlation detecting signal.

8. The communication apparatus as set forth in claim 7, wherein said received signal is expressed in a complex number and said average amplitude detecting means determines said average amplitude based on a square of a real part and a square of an imaginary part of said complex number.

9. The communication apparatus as set forth in claim 7, wherein said received signal is expressed in a complex number and said average amplitude detecting means determines said average amplitude based on an absolute value of a real part and an absolute value of an imaginary part of said complex number.

10. A correlation detecting method for detecting a correlation between a predetermined code and a received code of a received signal, comprising the steps of:

detecting said predetermined code from said received signal;

detecting an average amplitude of said received signal;

normalizing an output of said step of detecting said predetermined code based on an output of said step of detecting said average amplitude; and comparing said output of said step of detecting said predetermined code normalized by said step of normalizing with a threshold value for outputting a correlation detecting signal.

11. The correlation detecting method as set forth in claim 10, wherein said received signal is expressed in a complex number and said step of detecting said average amplitude determines said average amplitude based on a square of a real part and a square of an imaginary part of said complex number.

12. The correlation detecting method as set forth in claim 10, wherein said received signal is expressed in a complex number and said step of detecting said average amplitude determines said average amplitude based on an absolute value of a real part and an absolute value of an imaginary part of said complex number.

13. A communication method for receiving a received signal containing a synchronizing signal and for demodulating said received signal, comprising the steps of:

inputting said received signal;

detecting said synchronizing signal contained in said received signal; and demodulating and outputting a desired portion of said received signal based on a detecting timing of said synchronizing signal, wherein said step of detecting said synchronizing signal includes the steps of
  detecting a predetermined signal from said received signal,
  detecting an average amplitude of said received signal,
  normalizing an output of said step of detecting said predetermined signal based on an output of said step of detecting said average amplitude, and
  comparing said output of said step of detecting said predetermined signal normalized by said step of normalizing with a threshold value for outputting a correlation detecting signal.

14. The communication method as set forth in claim 13, wherein said received signal is expressed in a complex number and said step of detecting said average amplitude determines said average amplitude based on a square of a real part and a square of an imaginary part of said complex number.

15. The communication method as set forth in claim 13, wherein said received signal is expressed in a complex number and said step of detecting said average amplitude determines said average amplitude based on an absolute value of a real part and an absolute value of an imaginary part of said complex number.

16. A communication method for receiving a received signal containing a synchronizing signal and for transmitting data based on a detecting timing of said received signal, comprising the steps of:

inputting said received signal;

detecting said synchronizing signal contained in said received signal; and transmitting said data based on said detecting timing of said synchronizing signal, wherein said step of detecting said synchronizing signal includes the steps of
  detecting a predetermined signal from said received signal,
  detecting an average amplitude of said received signal,
  normalizing an output of said step of detecting a predetermined signal based on an output of said step of detecting said average amplitude, and
  comparing said output of said step of detecting said predetermined signal normalized by said step of normalizing with a threshold value for outputting a correlation detecting signal.

17. The communication method as set forth in claim 16, wherein said received signal is expressed in a complex number and said step of detecting said average amplitude determines said average amplitude based on a square of a real part and a square of an imaginary part of said complex number.

18. The communication method as set forth in claim 16, wherein said received signal is expressed in a complex number and said step of detecting said average amplitude determines said average amplitude based on an absolute value of a real part and an absolute value of an imaginary part of said complex number.

* * * * *